United States Patent [19]

Unuma

[11] Patent Number: 4,925,076

[45] Date of Patent: May 15, 1990

[54] PAPER FEEDER

[75] Inventor: Sadao Unuma, Yokonemachi, Japan

[73] Assignee: Tokai Kogyo Kabushiki Kaisha, Aichi, Japan

[21] Appl. No.: 306,746

[22] Filed: Feb. 6, 1989

[30] Foreign Application Priority Data

Feb. 4, 1988 [JP] Japan ............................ 63-14051[U]

[51] Int. Cl.[5] ............................................... G03B 1/30

[52] U.S. Cl. ...................................................... 226/74

[58] Field of Search ....................... 226/74, 75, 76, 84, 226/85

[56] References Cited

U.S. PATENT DOCUMENTS

| | | | |
|---|---|---|---|
| 4,129,239 | 12/1978 | Hubbard | 226/75 |
| 4,611,737 | 9/1986 | Hubbard et al. | 226/74 |
| 4,706,861 | 11/1987 | Kerivan | 226/74 |
| 4,790,467 | 12/1988 | Rex et al. | 226/76 X |

*Primary Examiner*—Donald Watkins

*Attorney, Agent, or Firm*—Wenderoth, Lind & Ponack

[57] ABSTRACT

A paper feeder for tractor-feed printers. A frame movably mounts an endless belt having a plurality of feed pins. A cover is pivotably mounted to the frame and may be pivoted between open and closed positions. In the closed position a lower surface of the cover faces the endless belt. An elastically deformable holding member extends from the lower surface of the cover to urge the paper into engagement with the feed pins.

6 Claims, 7 Drawing Sheets

PAPER FEEDER

FIELD OF THE INVENTION

This invention belongs to the field of paper feeders constructed so that perforated paper is driven by a feed belt with feed pins, which project from the outer circumferential surface of the feed belt, engaged with perforations in both edge portions of the perforated paper.

The paper feeder according to the present invention is set in a printer for a computer or a word processor and is used to feed perforated printing paper intermittently at predetermined intervals and print information thereon, or so as to feed such perforated paper continuously.

DESCRIPTION OF THE RELATED ART

A prior art feeder has an endless feed belt which is provided on its outer circumferential surface with feed pins projecting outwardly therefrom and adapted to be fitted in and engaged with perforations in perforated paper. The feed belt is disposed so that it can be moved between a pair of unitarily connected side frames, and a cover is fixed to one side frame so that the cover can be turned in opening and closing directions around a fulcrum shaft. The cover is adapted to be closed during the feeding of the paper and extend just over the paper feeding surface of the feed belt, the cover preventing the floating of the perforated paper where the perforated paper is being driven in accordance with the movement of the feed belt with the feed pins of the feed belt fitted in the perforations in the paper.

As shown in U.S. Pat. No. 4,611,737, the cover in a conventional paper feeder is closed due to the tensile force of a tension spring and placed just over the feed belt during the feeding of paper, this cover also preventing the perforated paper from floating. The clearance between the paper feed surface of the feed belt or those of the side frames and the cover is kept constant unless an opening force is applied to the cover against the tensile force of the tension spring.

Therefore, when the perforated paper, the thickness of which is small for the depth of this clearance, is fed at a high speed or a high acceleration, the accompanying air current enters the space between the paper feed surface of the feed belt or those of the side frames and the perforated paper, or the perforated paper resonates with the vibration of the feed belt whether the perforated paper being fed consists of one sheet of thin paper or a plurality of sheets of laminated paper. This prevents the cylindrical portions which constitute the lower half portions of the feed pins from fitting accurately in the perforations.

Consequently, the riding of the feed pins on the portions of the perforated paper which are outside the perforations, the deformation of the perforations, the breakage of the portions of the perforated paper which are around the perforations, or the jamming of the perforated paper in the feeder occurs in some cases. This would cause the paper feeding operation to be stopped.

When perforated paper including wrinkles or bent portions is fed, the pitch of the perforations in the paper becomes differenı from that of the feed pins provided on the feed belt, and the jamming of the paper readily occurs.

Laminated paper, such as slips, are formed by binding it at one or both end portions with paste or a sewing thread. However, if the bound portion of such laminated paper is loosened, the perforations in each piece of paper, which must originally be aligned in the direction of the thickness of the paper, come out of alignment in the paper feeding direction. Since a means for correcting the loosened papers, is not provided, the paper feeding accuracy decreases, and the jamming of the paper readily occurs.

SUMMARY OF THE INVENTION

A first object of the present invention is to improve the paper feeding accuracy by accurately fitting the cylindrical portions of the feed pins in the perforations in the perforated paper, so as to enable the perforated paper to be fed at a high speed and a high acceleration.

A second object of the present invention is to prevent the deformation and breakage of the perforations in the perforated paper and the jamming of the paper, which tend to occur in a conventional paper feeder of this type, during a paper feeding operation by accurately fitting the cylindrical portions of the feed pins in the perforations in the paper.

The above objects are achieved by a paper feeder having an endless feed belt which is provided on its outer circumferential surface with feed pins projecting outwardly therefrom and adapted to be fitted in the perforations in the perforated paper. The feed belt is disposed so that the feed belt can be moved between a pair of unitarily connected side frames, and a cover which is fixed to one side frame so that the cover can be turned in opening and closing directions around a fulcrum shaft. The cover is adapted to be closed during the feeding of the paper and extend just over the paper feed surface of the feed belt, the cover preventing the floating of the perforated paper when the perforated paper is being driven in accordance with the movement of the feed belt with the feed pins of the feed belt fitted in the perforations in the paper. A elastically deformable paper holding member is attached to the portion of the lower surface of the cover which is opposed to the paper feed surface of the feed belt, in such a manner that the paper holding member extends in the perforated paper feeding direction, this paper holding member being deformed elastically in accordance with the thickness of the paper, whereby the perforated paper is driven with the paper holding member pressing the paper elastically against the paper feed surface of the feed belt with a small force.

The above and other objects, advantages and features of the present invention will be fully understood from the following description.

DETAILED DESCRIPTION OF THE INVENTION

Figure 1:
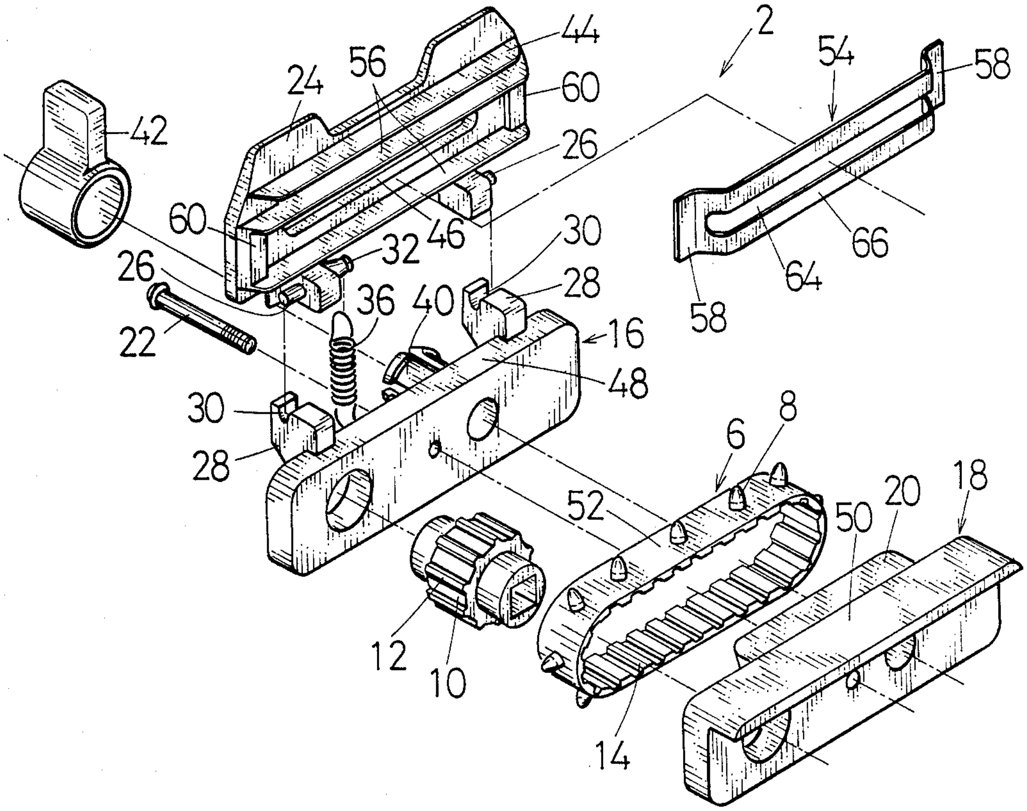
FIG. 1 is an exploded perspective view of the paper feeder according to the present invention.

The present invention will now be described in detail on the basis of a first embodiment thereof.

A paper feeder 2 as a whole will be described first, and a cover 24, which constitutes a characteristic portion of the present invention, thereafter.

The paper feeder 2 shown in FIGS. 1–6 is of a belt driven type. An endless feed belt 6 for feeding perforated paper 4 is formed of a flexible material, such as rubber, and provided on its outer circumferential surface with a plurality of feed pins 8 arranged in a projecting state at predetermined intervals. The feed belt 6 is further provided on its inner circumferential surface with a plurality of inner teeth 14 adapted to meshed with outer teeth 12 provided on a driving sprocket 10.

The sprocket 10 is disposed between and supported rotatably on a pair of frames 16, 18 which are joined to each other unitarily by a connecting bolt 22. The sprocket 10 is supported on one lengthwise end portion of one side frame 16 or 18 and the opposed end portion of the other side frame 18 or 16. The feed belt 6 is passed around this sprocket 10 and a belt receiver 20 provided on the side frame 18.

A pair of fulcrum shafts 26 are provided on one widthwise end portion of the cover 24 so that the fulcrum shafts 26 are spaced by a predetermined distance in the paper feeding direction. The axes of these fulcrum shafts 26 extend in parallel with the paper feeding direction. The side frame 16 is provided at both lengthwise end portions thereof with cover receivers 28, and the fulcrum shafts 26 provided on the cover 24 are inserted in recesses 30 formed in the cover receivers 28.

Figure 4:
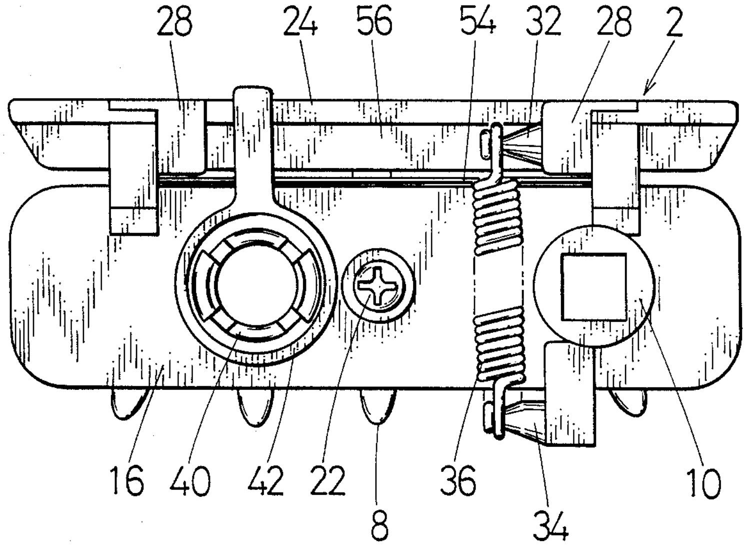
FIG. 4 is a front elevation of the paper feeder according to the present invention.

As shown in FIGS. 1 and 4, the cover 24 and a lower end portion of the side frame 16 are provided with spring arms 32, 34, to which a tension spring 36 is fastened.

If the cover 24 is turned around the fulcrum shafts 26, it is closed and opened with respect to the pair of unitarily connected side frames 16, 18. While the cover 24 is closed, it is urged in the closing direction by the tensile force of the tension spring 36.

Figure 12:
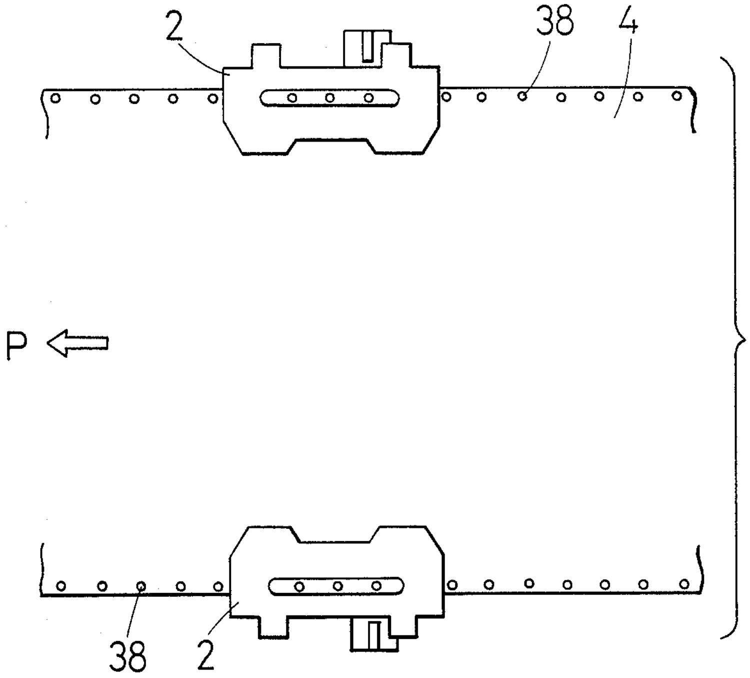
FIG. 12 is a plan view of the perforated paper 4 fed by a pair of the paper feeders.

The cover 24 has the function of preventing the floating of the perforated paper 4 which is fed with the feed pins 8 fitted in the perforations 38 (refer to FIG. 12). The cover 24 also has the function of absorbing pressure, imparted thereto when an abnormal phenomenon occurs, by the cover 24 turning in the opening direction against the resilient force of the tension spring 36. The function of absorbing pressure occurs when, for example perforated paper of a thickness greater than a set thickness, or locally wrinkled or bent perforated paper, is fed.

One side frame 16 is provided with a bearing member 40 through which a support pipe (not shown) is inserted and supported, and a lock member 42 is engages with the bearing member 40 such that the paper feeder 2 is fixed to the support pipe.

As shown in FIG. 12, two paper feeders 2 having a symmetric shape are fixed to the support pipe so that the paper feeders 2 are spaced from each other by a distance corresponding to the width of the perforated paper 4, and the feed belt 6 is driven by the rotation of the sprocket 10 to cause the paper to move. The feed pins 8 on the feed belt 6 are fitted in the perforations 38 provided in both edge portions of the perforated paper 4, and this paper 4 is fed in a widthwise tensed state intermittently by a set distance or continuously in the direction of an arrow P by the driving force of the feed belt 6.

Each of the feed pins 8 projecting from the feed belt 6 consists of a cylindrical portion extending perpendicular to the belt surface, an involute surface portion having a curved surface similar to an involute surface and extending outward from the cylindrical portion, and a top portion.

Each feed pin 8 is formed so that the diameter of its cylindrical portion is equal to or slightly smaller than that of each perforation 38 in the perforated paper 4, to increase the contact area of each feed pin 8 and perforation 38. Accordingly, the paper feeding driving force effectively works on the circumferential portion of the perforation 38.

The height of the cylindrical portion of each feed pin 8 is set to a level corresponding to a maximum thickness (total thickness in case of multiple sheets of laminated paper) of the perforated paper 4 to be used. The interval of the feed pins 8 provided on the feed belt 6 is set equal to that of the perforations 38 provided in both edge portions of the perforated paper 4.

The cover 24 is provided with one or a plurality of float preventing ribs 44 for preventing the perforated paper 4 from floating while the paper is fed. This float preventing rib 44 extends in the paper feeding direction, and, moreover, it is provided on the portion of the cover 24 which is opposed to the straight path of the feed belt 6. The cover 24 is provided with an elongated bore 46 extending in the paper feeding direction, through which the placement of the perforations 38 over the feed pins 8 and the feeding condition of the perforated paper 4 can be ascertained.

The upper surfaces of the side frames 16, 18 constitute paper feed surfaces 48, 50, in addition to the upper or feed surface 52 of the feed belt.

The perforated paper 4 is fed by the driving force of the feed belt 6 with the feed pins 8 engaged in the perforations 38 in the perforated paper 4, which is in contact with the paper feed surfaces 48, 50, 52. The paper feed surface 52 of the feed belt is flush with or a slightly higher than those 48, 50 of the side frames 16, 18.

When perforated paper 4 having a regular and not especially small thickness is fed at a low speed, there is enough time for the cylindrical portions of the feed pins 8 to be inserted in the perforations 38, and for the perforated paper 4 to be brought into close contact with the paper feed surface 52 of the feed belt 6. Accordingly, the perforated paper 4 is fed with a high accuracy.

However, when the feed speed or acceleration of the perforated paper 4 is high, there is not enough time for the cylindrical portions of the feed pins 8 to be fitted in the perforations 38, and the air current accompanying the movement of the perforated paper 4 prevents the perforations 38 and feed pins 8 from engaging each other. Consequently, the paper is fed with the cylindrical portions of the feed pins 8 not satisfactorily fitted in the perforations 38.

This causes the perforations 38 to be deformed or the portions of the paper 4 which are in front of and at the back of the perforations 38 to be torn, and the intervals of the perforations 38 and those of the feed pins 8 become different, so that the paper feeding accuracy decreases in some cases. In the case where thin perforated paper is fed, it bounces between the feed belt 6 and cover 24 and runs on the feed pins 8 in some cases even if the paper feed speed is low. This causes the paper 4 to jam in some cases.

The paper feeder according to the present invention is provided with a paper holding member 54 on the cover 24 so as to prevent the occurrence of these phenomena.

Figure 2:
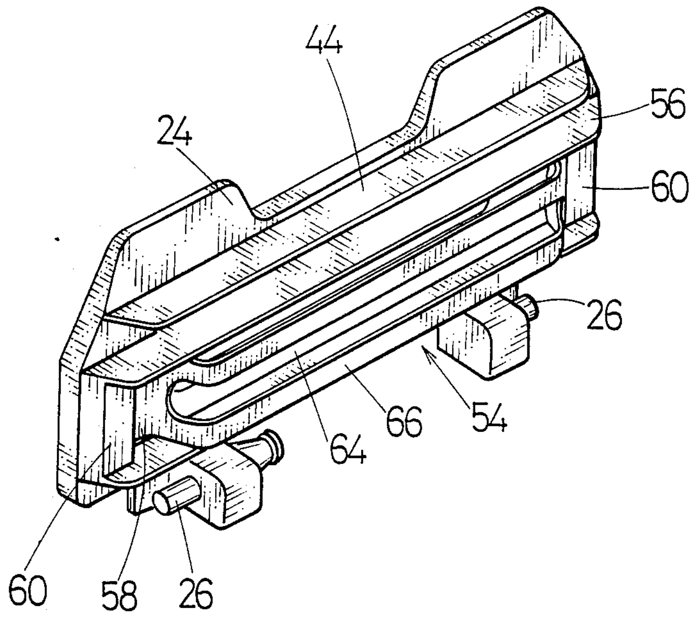
FIG. 2 is a perspective view of a cover with a paper holding member attached thereto.
Figure 3:
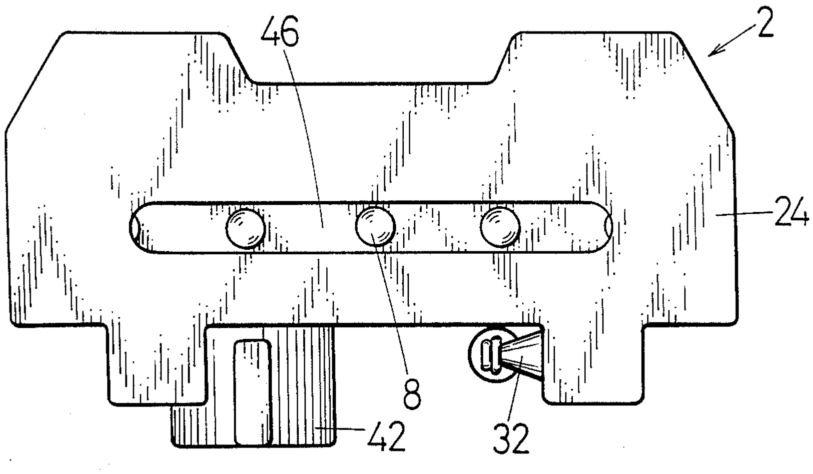
FIG. 3 is a plan view of the paper feeder according to the present invention.
Figure 5:
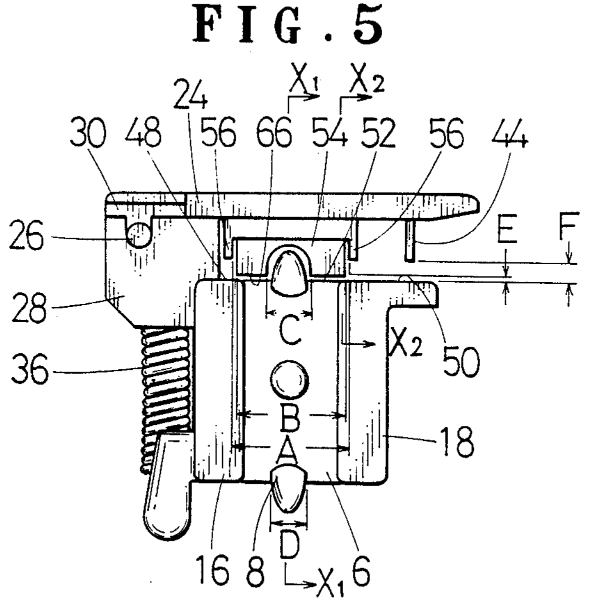
FIG. 5 is a right side elevation of the paper feeder according to the present invention.
Figure 6:
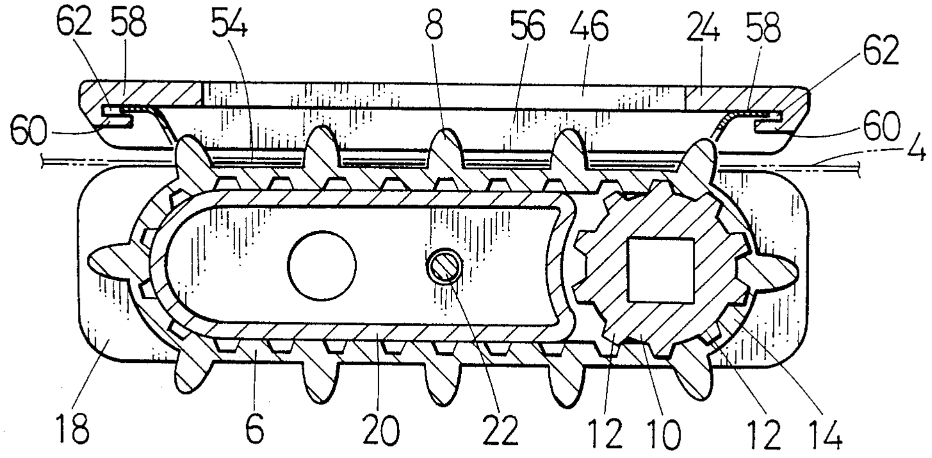
FIG. 6 is a sectional view taken along the line $X_1$—$X_1$ in FIG. 5.

As shown in FIGS. 1, 2 and 5, the float preventing rib 44 is positioned at a portion which is opposed to the paper feed surface 50 of the side frame 18 when the cover 24 is closed.

In addition to this float preventing rib 44, a pair of guide ribs 56 are provided on the portions of the lower surface of the cover 24 which are on the inner side of the float preventing ribs 44. These two guide ribs 56 are provided for the purpose of guiding the moving perforated paper 4 on the paper feed surface 52 of the feed belt 6.

The distance A between the inner side surfaces of the two guide ribs 56 is slightly larger than the width B of the paper holding member 54. The paper holding member 54 is disposed between the two guide ribs 56, which prevents the paper holding member 54 from being moved greatly at right angles to the paper feeding direction while the paper is fed. Slide lips 58 are provided at both end portions of the paper holding member 54. Lip receivers 60 are provided at both end portions of the cover 24 with respect to the paper feeding direction, and the slide lips 58 at both end portions of the paper holding member 54 are inserted in a loosely received state in recesses 62 in the lip recivers 60.

The paper holding member 54 is provided with an elongated bore 64 extending in the paper feeding direction, so as to prevent the inner surface of the paper holding member 54 from interfering with the feed pins 8 while the feed belt 6 is moving. The width C of this elongated bore 64 is slightly larger than the diameter D of the cylindrical portion of each feed pin 8.

The paper holding member 54 is formed out of an engineering plastic consisting of a material of low frictional resistance, such as a polyacetal resin, a nylon resin, or a compound material containing these resins as base materials, or a thin, resilient sheet metal. When an external force is applied to the paper holding member 54 fixed to the cover 24, it is elastically deformed. If the paper holding member 54 is formed out of a material of a low frictional resistance, the frictional resistance between the perforated paper and a paper holding surface 66 of the paper holding member 54 becomes small, and the feeding of the paper can be achieved smoothly.

Several wires may be arranged so as to extend in the paper feeding direction and function in the same manner as the paper holding member 54.

Inside the cover 24 a clearance E, the depth of which is equal to or smaller than the thickness of the perforated paper 4 to be used, is formed between the paper holding surface 66 and the paper feed surface 52 of the feed belt 6. Alternatively, the paper holding surface 66 contacts the paper feed surface 52 of the feed belt 6 with such a small force that does not hamper the paper feeding operation.

The depth of a clearance F between the lower surface of the float preventing rib 44 and the paper feed surface 50 of the side frame 18 is set equal to a maximum thickness of the perforated paper 4 to be used. The depth of the clearance E between the paper holding surface 66 of the paper holding member 54 and the paper feed surface 52 of the feed belt 6 is naturally far smaller than that of this clearance F.

Figure 7:
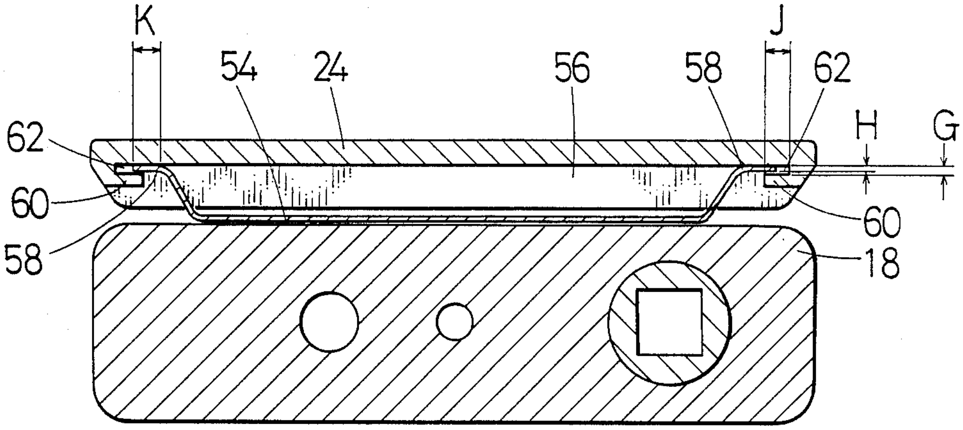
FIG. 7 is a sectional view taken along the line $X_2$—$X_2$ in FIG. 5 with perforated paper not shown.

Referring to FIG. 7, the height G of the recess 62 provided in each lip receiver 60 is larger than the thickness H of the paper holding member 54, and the length J of the recess 62 smaller than that of length K of the slide lip 58 of the paper holding member 54. Owing to such construction of the cover 24 and paper holding member 54, the paper holding member 54 can be elastically deformed with the paper holding surface 66 thereof kept flat, i.e., without causing the surface 66 to be bent as the two slide slips 58 are moved in the opposite directions in accordance with the thickness of the perforated paper 4 in use. Namely, during this time, the paper holding member 54 can be moved in the direction perpendicular to the paper feed surface 52 of the feed belt 6.

Since the paper holding member 54 is elastically deformed with the paper holding surface 66 thereof kept flat, i.e., without causing the surface 66 to be bent, the perforated paper 4 is pressed substantially uniformly at the whole surface thereof against the paper feed surface 52 of the feed belt 6. Since the portions of the perforated paper 4 which are around the perforations 38 are also pressed in this manner, the cylindrical portions of the feed pins 8 are inserted accurately in the perforations 38. As a result, the floating of the perforated paper 4 being fed is reliably prevented, so that the paper feeding accuracy is improved.

Figure 8:
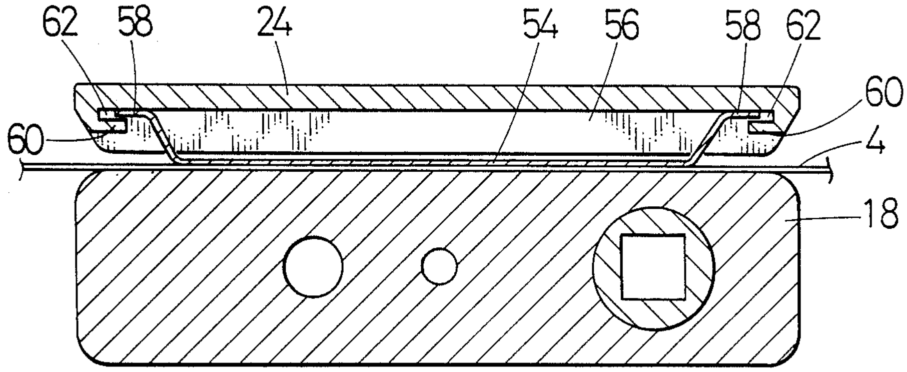
FIG. 8 is a sectional view taken along the line $X_2$—$X_2$ in FIG. 5 with one sheet of perforated paper 4 fed.
Figure 9:
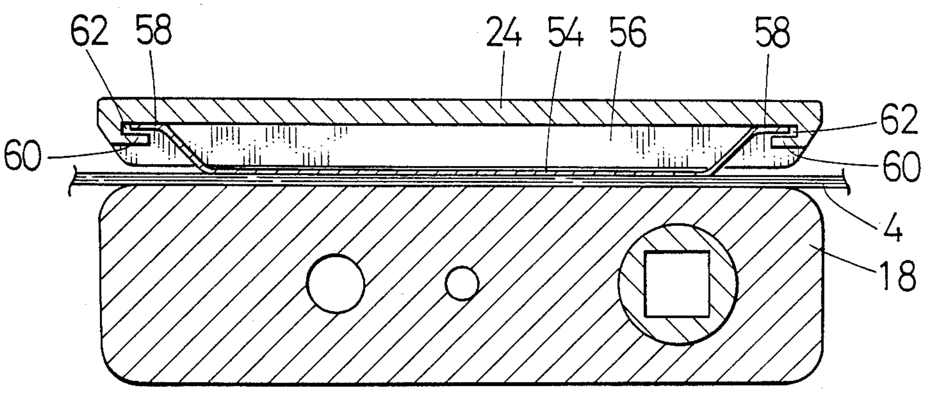
FIG. 9 is a sectional view taken along the line $X_2$—$X_2$ in FIG. 5 with a plurality of sheets of perforated paper fed.
Figure 10:
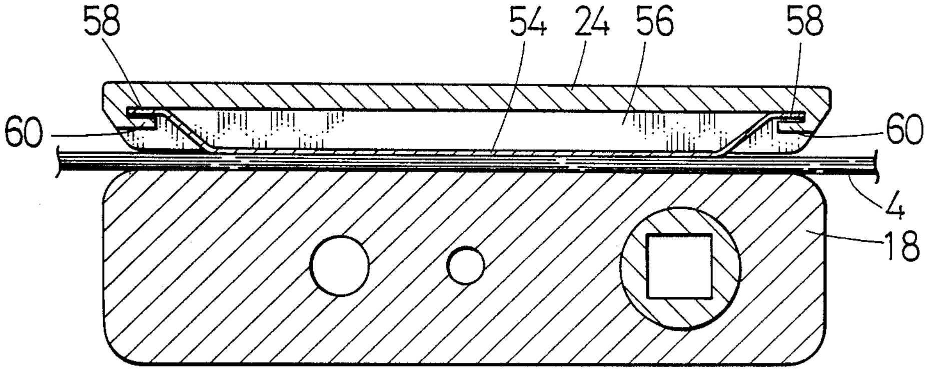
FIG. 10 is a sectional view taken along the line $X_2$—$X_2$ in FIG. 5 with multiple sheets of perforated paper fed.

The thickness and number of sheets of the perforated paper 4 used in a printer vary according to the contents of the information to be printed. As shown in FIGS. 8–10, the paper holding member 54 is elastically deformed, in accordance with the thickness of the perforated paper 4 in use, to move in the direction perpendicular to the paper feed surface 52 of the feed belt 6. When the paper holding member 54 is elastically deformed, the perforated paper 4 being fed is pressed against the paper feed surface 52 of the feed belt 6 under a predetermined pressure due to the elastic restoring force thereof.

Due to the elastic deformation of the paper holding member 54, the floating of the perforated paper 4 off the feed belt 6 is prevented, and the cylindrical portions of the feed pins 8 are inserted reliably in the perforations 38 of the perforated paper 4. Thus, the perforated paper is fed smoothly a predetermined distance at a time without causing the deformation of perforations and the breakage and jamming of the perforated paper 4.

The perforated paper 4 is thus pressed under a predetermined pressure by the elastic restoring force of the paper holding member 54. Accordingly, even when bent or wrinkled perforated paper, or multiple sheets of laminated perforated paper the bound portion of which is loosened is fed, the paper is corrected to be flat, or the perforations 38 in the laminated paper are aligned in the direction of the thickness thereof. This enables the perforated paper to be fed with a high accuracy.

Figure 11:
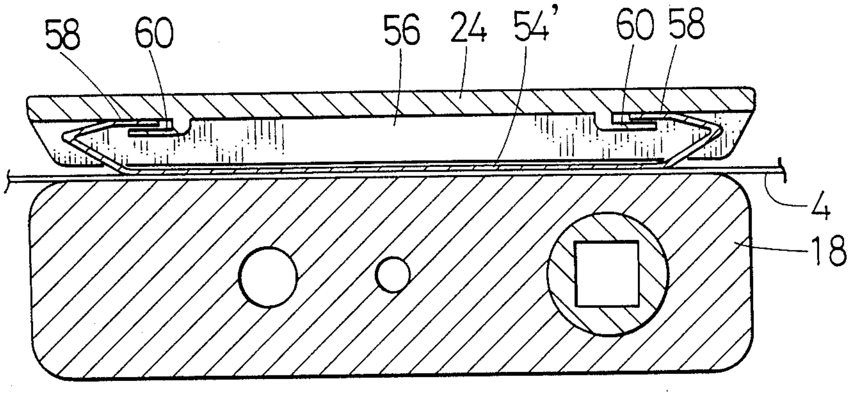
FIG. 11 is a sectional view of the cover with a paper holding member of a second embodiment attached thereto.

Even when the slide lips 58 provided at both end portions of a paper 54' and the lip receivers 60 provided on the cover 24 are shaped as shown in FIG. 11, the paper holding member 54' is elastically deformed with the paper holding surface 66 thereof kept flat.

Since the cover of the paper feeder according to the present invention is provided on the lower surface thereof with an elastically deformable paper holding member, the perforated paper sent by the feed belt is pressed resiliently against the paper feed surface of the feed belt by the paper holding member, and the cylindrical portions of the feed pins are inserted in the perforations accurately, whereby the floating and bouncing of the perforated paper on the feed belt are prevented.

Thus, the cylindrical portions of the feed pins are inserted accurately in the perforations, and the portions of the perforated paper which are closest to the perforations are pressed by the paper holding member. Consequently, the deformation and breakage of the perforations and the jamming of the perforated paper are prevented, and the perforated paper feeding accuracy is improved. The improvement of the paper feeding accuracy enables the paper feeding intervals to become accurate, and the printing accuracy of a printer to be improved.

The slide lips are provided at both end portions of the paper holding member, and they are engaged in a loosely fitted state, i.e., with clearnace, in the lip receivers provided on the cover. If the paper holding member is attached to the cover, the slide lips are moved in opposite directions during a paper feeding operation with the variation of the thickness of the paper, and the paper holding surface of the paper holding member is kept flat, i.e., is not bent. Accordingly, the i.e., without being bent. Accordingly, the perforated paper is pressed substantially uniformly over its whole surface against the paper feed surface of the feed belt, and the pressing force by which the paper is pressed is proportional to the thickness of the paper.

Since the deformation and breakage of the perforations in the perforated paper are prevented, of jamming of the perforated paper, which is ascribable to these phenomena, does not occur.

I claim:

1. A paper feeder, comprising:

frame means;

an endless belt mounted for movement in said frame means, said endless belt including a plurality of feed pins projecting from an outer circumferential surface thereof and adapted to engage perforations in paper to be fed;

a cover pivotably attached to said frame means, said cover being pivotable between an open position in which the paper can be inserted into said paper feeder and engage with said feed pins, and a closed position in which the paper can be fed and a lower surface is in facing relation with the paper engaged with said feed pins; and an elastically deformable holding member extending from said lower surface of said cover, whereby when said cover is in said closed position said holding member urges the paper into engagement with said feed pins.

2. A paper feeder as in claim 1, wherein said cover includes a plurality of lip receiving slots, said holding member includes a plurality of slide lips, said slide lips being slidingly received within respective ones of said slots with clearance.

3. A paper feeder as in cliam 1, wherein said holding member is formed of a plastic.

4. A paper feeder as in claim 3, wherein said plastic includes at least one plastic from the group consisting of nylon resin and polyacetal resin.

5. A paper feeder as in claim 1, wherein said cover includes a pair of guide ribs, each of said guide ribs extending outwardly from said lower surface and in a feed direction of the paper, said guide ribs being parallel to each other, and said holding member extending from an area of said lower surface intermediate said guide ribs.

6. A paper feeder as in claim 1, wherein said holding member is formed of thin sheet metal.

* * * * *